United States Patent Office 2,998,445
Patented Aug. 29, 1961

2,998,445
POLYGLYCOL CARBAMATES
William T. Stewart, El Cerrito, Warren Lowe, San Francisco, Frank W. Kavanagh, Berkeley, and Frank A. Stuart, Orinda, Calif., assignors to California Research Corporation, San Francisco, Calif., a corporation of Delaware
No Drawing. Filed June 22, 1959, Ser. No. 821,684
3 Claims. (Cl. 260—482)

This invention relates to novel polyglycol carbamates. More particularly, the invention is concerned with important new N-ethylenically unsaturated acyloxyalkyl polyalkylene glycol carbamates useful in the preparation of valuable polymeric compounds.

The compounds of this invention are N-ethylenically unsaturated acyloxyalkyl polyethylene glycol carbamates and monoalkyl ethers thereof in which the ethylenically unsaturated acyloxy groups contain up to 20 carbon atoms, the alkyl group connecting the acyloxy group and the carbamate nitrogen contains from 2 to 7 carbon atoms and the polyalkylene glycol which is monoester-linked to the carbamate group contains from 2 to 7 carbon atoms in each alkylene group and in the case of the monoalkyl ethers of said polyalkylene glycols contains from 1 to 18 carbon atoms in the alkyl ether group, the molecular weight of the polyalkylene glycols being between about 220 and 30,000.

The polyglycol carbamates of the invention are superior monomeric intermediates for the preparation of valuable polymers. They polymerize readily with a wide variety of monomers to provide many types of polymers having polyglycol chains attached to the polymeric "backbone." Such polymers in turn are useful as detergents and dispersants in mineral lubricating oils and hydrocarbon fuels. They are also suitable as surface-active agents for other general applications.

Illustrative polymers containing the N-ethylenically unsaturated acyloxyalkyl polyalkylene glycol carbamates according to this invention have been disclosed and are covered in copending application Serial No. 729,560 and now U. S. Patent 2,892,783 of Frank A. Stuart, William T. Stewart, Warren Lowe and Frank W. Kavanagh, filed April 21, 1958, of which the present application is a continuation-in-part.

The polyglycol carbamates of the invention which may also be termed polyalkylene glycol N-ethylenically unsaturated acyloxyalkyl carbamates have the general structural formula:

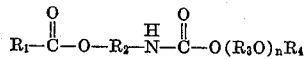

wherein $R_1$ is an alkenyl group of 2 to 19 carbon atoms, $R_2$ and $R_3$ are alkylene groups of 2 to 7 carbon atoms which may be the same or different, $R_4$ is a member of the group consisting of hydrogen and alkyl groups of 1 to 18 carbon atoms and $n$ is an integer indicating the number of oxyalkylene groups in the polyalkylene glycol equal to a total molecular weight between about 220 and 30,000.

The alkenyl group attached to the carbonyl carbon in the ethylenically-unsaturated acyloxy group of the carbamates according to the invention may be either straight or branched chain in structure.

The alkyl or alkylene group as it is referred to in the formula above linking the acyloxy group and the nitrogen atom of the carbamates contains from 2 to 7 carbon atoms, as already mentioned. The number of carbon atoms in this group is independent of the number of carbon atoms of the alkylene groups in the polyalkylene glycol.

The polyglycol group of the compounds of the invention contains at least 5 alkylene oxide units of alkylene groups of 2 to 7 carbon atoms each as already stated. Up to about 690 or preferably 230 of these alkylene oxide groups are present in the polyglycol group. The end of the polyglycol group other than that ester-linked to the carbamate group may be hydroxyl or alkyl or it may have other terminal groups including polar groups.

The polyalkylene glycols of the polyglycol monomeric compounds of the invention have the above-described essential characteristics. Poly-1,2-alkylene glycols and their alkyl ethers having molecular weights between about 220 and 30,000 are preferred. Such polyglycols may be obtained by polymerizing 1,2-alkylene oxides or mixtures thereof in the presence of a catalyst and a suitable initiator for the reaction such as water or monohydric aliphatic alcohol in the case of the alkyl ethers. The preparation of polyglycol compounds of this type has been fully described heretofore in the U.S. Patents 2,448,664 and 2,457,139, for example, and therefore requires no detailed discussion here.

For present purposes, the most suitable poly-1,2-alkylene glycol groups are those derived from ethylene oxide or from 1,2-propylene oxide or mixtures thereof and their alkyl ethers of 1 to 18 carbon atoms per alkyl group which have molecular weights or average molecular weights between about 220 and 30,000, preferably between about 400 and 10,000. These polyalkylene glycol groups provide monomers useful in the preparation of outstanding detergent copolymers.

The following polyalkylene glycol groups containing from 2 to 7 carbon atoms in each alkylene group are illustrative of the types described above:

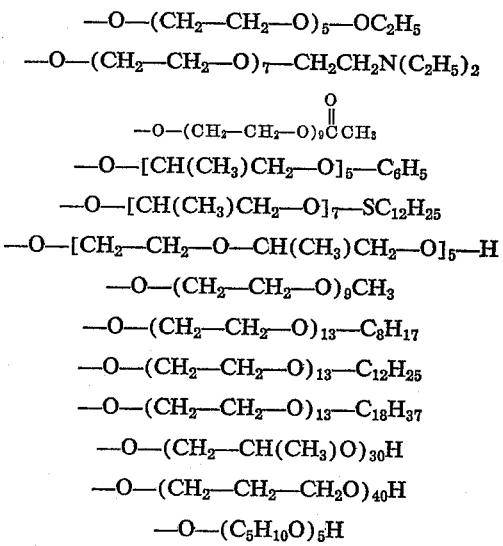

Polyethylene glycol mixtures having average molecular weights of 220, 400, 1000, 1540, 2000 or 10,000 and monoalkyl ethers thereof.

Poly-1,2-propylene glycol mixtures having average molecular weights of 425, 1025 or 10,000 and monoalkyl ethers thereof.

In the above illustrative polyalkylene glycol groups, the terminal O is the ester-linking oxygen group as already described which connects the polyglycol portion to the carbamate group of the molecule in the polyglycol carbamate monomers.

The N-ethylenically unsaturated acyloxyalkyl polyglycol carbamates according to the invention are prepared by various methods. For example, an isocyanato alkyl ester of an ethylenically unsaturated monocarboxylic acid such as β-isocyanato ethyl acrylate is reacted with a polyalkylene glycol, such as polyethylene glycol. Ordinary temperatures are suitable and no particular catalysts are required. Solvents such as benzene are desirable to facilitate handling of the materials. The reaction may be accelerated by the use of heating and pressure.

The following examples are illustrative of the various N-ethylenically unsaturated acyloxyalkyl polyalkyene glycol carbamates according to the invention and their preparation. The proportions unless otherwise specified are given on a weight basis.

*Example I*

This example shows the preparation of N-β-acryloxyethyl polyethylene glycol carbamate, in which the polyethylene glycol has a molecular weight of about 1800.

A solution of polyethylene glycol (128 g., 0.071 mole) in 250 ml. of benzene was dried by azeotroping and then cooled to 10° C. To this solution was added with stirring over a period of 30 minutes a solution of β-isocyanatoethyl acrylate (10 g., 0.071 mole) in 20 ml. of dry benzene. The reaction mixture was then allowed to stand at room temperature for three days.

The above product was copolymerized with dodecyl methacrylate in the presence of free radical initiator azobisisobutyronitrile to give a polymer containing polyglycol units.

In the following table, additional examples of N-ethylenically unsaturated acyloxyalkyl polyalkylene glycol carbamates according to the invention are given. In these examples, the polyglycol carbamates are prepared by the procedure outlined in the preceding example.

| Example No. | Isocyanatoalkyl Ester | Alkylene Oxide or Polyalkylene Glycol |
|---|---|---|
| II | β-isocyanatoethyl methacrylate. | Polymer of 1,2-propylene oxide (15 moles). |
| III | Gamma-isocyanatopropylcrotonate. | Octadecyl ether of eicosaethylene glycol. |
| IV | β-isocyanatoethyl angelate. | Polymer of ethylene oxide and 1,2-propylene oxide mixture (10 moles in approximately 1:1 mole ratio). |
| V | α-isocyanatomethyl acrylate. | Methyl monoether of polyethylene glycol (average molecular weight 750). |
| VI | β-isocyanatoethyl 2-hexadecenoate. | Polymer of ethylene oxide (200 moles). |
| VII | α-isocyanatoethyl acrylate. | Polymer of 1,3-propylene oxide (4 moles). |
| VIII | β-isocyanatohexyl methacrylate. | Polymer of ethylene oxide (40 moles). |

Other variations within the scope of this invention of the types of N-unsaturated acyloxyalkyl polyalkylene glycol carbamates will be apparent to one skilled in the art from the above illustrative examples.

We claim:
1. N-ethylenically unsaturated acyloxyalkyl polyalkylene glycol carbamates having the general formula:

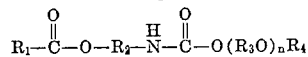

wherein $R_1$ is an unsaturated akyl group of 2 to 3 carbon atoms, $R_2$ and $R_3$ are alkylene groups of 2 to 3 carbon atoms, $R_4$ is a member of the group consisting of hydrogen and alkyl groups of 1 to 18 carbon atoms and $n$ is an integer indicating the number of oxyalkylene groups in the polyalkylene glycol equal to the total molecular weight between about 400 and 10,000.

2. N-β-acryloxyethyl polyethylene glycol carbamate in which the polyethylene glycol has a molecular weight of 400 to 10,000.

3. N-β-methacryloxyethyl polyethylene glycol carbamate in which the polyethylene glycol has a molecular weight of 400 to 10,000.

References Cited in the file of this patent

UNITED STATES PATENTS 2,218,939     Steindorff et al.     Oct. 22, 1940
2,626,278     Wystrach et al.     Jan. 30, 1953